United States Patent
DeFelice (10) Patent No.: US 10,428,971 B1
(45) Date of Patent: Oct. 1, 2019

(54) INLINE AIR VALVE NOSE CAP FOR REDUCED CONTAMINATION

(71) Applicant: Hamilton Sundstrand Corporation, Charlotte, NC (US)

(72) Inventor: Robert DeFelice, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 17 days.

(21) Appl. No.: 15/913,005

(22) Filed: Mar. 6, 2018

(51) Int. Cl.
*F16K 1/12* (2006.01)
*F16K 31/122* (2006.01)
*F16K 17/10* (2006.01)

(52) U.S. Cl.
CPC .......... *F16K 31/1221* (2013.01); *F16K 17/10* (2013.01); *F16K 31/1223* (2013.01); *F16K 1/126* (2013.01); *Y10T 137/3421* (2015.04)

(58) Field of Classification Search
CPC ......... Y10T 137/3367; Y10T 137/3421; Y10T 137/7785; F16K 1/126
See application file for complete search history.

(56) References Cited

U.S. PATENT DOCUMENTS

| | | | | |
|---|---|---|---|---|
| 845,063 A * | 2/1907 | Desper | ..................... | F16K 1/126 137/219 |
| 922,578 A * | 5/1909 | Gries | ...................... | F16K 17/30 137/220 |
| 2,297,082 A * | 9/1942 | Staats | ....................... | F16K 1/12 137/219 |
| 3,338,259 A * | 8/1967 | Tribe | ...................... | F16K 1/126 137/220 |
| 3,489,165 A * | 1/1970 | Salerno | .................... | F16K 1/126 137/220 |
| 3,586,033 A * | 6/1971 | Hieber | .................... | B64D 39/06 137/220 |
| 4,319,604 A * | 3/1982 | Bird | ......................... | F16K 17/00 137/460 |
| 5,465,751 A * | 11/1995 | Newton | .................. | F16K 17/30 137/498 |
| 8,910,653 B2 | 12/2014 | McAuliffe et al. | | |
| 9,010,366 B2 | 4/2015 | Marocchini et al. | | |
| 9,062,644 B2 | 6/2015 | Erb | | |
| 9,784,184 B2 | 10/2017 | Marocchini et al. | | |

(Continued)

FOREIGN PATENT DOCUMENTS

WO   WO 2009061166 A1   5/2009

*Primary Examiner* — Robert K Arundale
(74) *Attorney, Agent, or Firm* — Kinney & Lange, P.A.

(57) ABSTRACT

A valve assembly includes a flow duct with an inlet and an outlet downstream from the inlet. A piston housing is inside the flow duct and is axially aligned with a center axis of the flow duct. A piston is inside the piston housing and is configured to extend downstream of the piston housing in a closed position. A control chamber is between the piston and an upstream end of the piston housing. A control opening extends through the upstream end of the piston housing and fluidically communicates with the flow duct and the control chamber. A cap extends through the control opening. A cap passage extends through the cap and has an inlet outside of the piston housing and an outlet inside the piston housing, and includes two ninety-degree turns between the inlet and the outlet of the cap passage.

20 Claims, 4 Drawing Sheets

(56) References Cited

U.S. PATENT DOCUMENTS

| | | | |
|---|---|---|---|
| 2005/0019156 A1* | 1/2005 | D'Angelo | F01D 17/105 415/144 |
| 2016/0237913 A1 | 8/2016 | Marocchini et al. | |
| 2016/0273450 A1 | 9/2016 | Marocchini et al. | |
| 2017/0342853 A1 | 11/2017 | Schwalm et al. | |

* cited by examiner

INLINE AIR VALVE NOSE CAP FOR REDUCED CONTAMINATION

STATEMENT OF GOVERNMENT INTEREST

This invention was made with government support under Contract No. FA8626-16-C-2139, awarded by the United States Air Force. The government has certain rights in the invention.

BACKGROUND

The present disclosure relates to a self-actuated bleed valve for assisting start-up of a gas turbine engine.

Gas turbine engines are provided with a number of functional sections, including a fan section, a compressor section, a combustion section, and a turbine section. Air and fuel are combusted in the combustion section. The products of the combustion section move downstream, and pass over a series of turbine rotors in the turbine section, thereby driving the turbine rotors to provide power. The turbine rotors in the turbine section drive the compressor section and the fan section.

At start-up, the turbine section of the gas turbine engine takes time to fully provide power to the compressor section and fan section. Thus, driving the compressor section at start-up is more challenging for the turbine section than at steady state conditions. Prior art gas turbine engines generally include a bleed valve to bleed air away from the compressor section during start-up to reduce the load the turbine section experiences from the compressor section. The valve is open at start-up and moved to a closed position after start-up has been completed.

The actuation of many prior art bleed valves is controlled with external active control mechanisms, such as solenoids. The actuation of some prior art bleed valves is controlled passively and mechanically by a spring that biases a piston open. In these passively controlled bleed valves, the piston closes when the total gage pressure of the flow upstream of the piston exceeds the biasing force of the spring. A passively controlled bleed valve that relies on the total upstream gage pressure of the flow for control may be exposed to particles and contamination ingested by the gas turbine engine.

SUMMARY

In one aspect of the invention, a valve assembly includes a flow duct with an inlet and an outlet downstream from the inlet. A piston housing is inside the flow duct and is axially aligned with a center axis of the flow duct. A piston is inside the piston housing and is configured to extend downstream of the piston housing in a closed position. A spring is at least partially inside the piston and contacts the piston and biases the piston to an open position. A control chamber is between the piston and an upstream end of the piston housing. A control opening extends through the upstream end of the piston housing and fluidically communicates with the flow duct and the control chamber. A cap extends through the control opening and includes a cylindrical body extending through the control opening. The cap also includes a closed upstream end and a closed downstream end. A bore is formed in the cylindrical body and extends between the closed upstream end and the closed downstream end. A first hole extends radially through the cylindrical body between the closed upstream end and the piston housing. A second hole extends radially through the cylindrical body between the piston housing and the closed downstream end.

In another aspect of the invention, a valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A piston is inside the piston housing and is configured to extend downstream of the piston housing in a closed position. A spring is at least partially inside the piston and contacts the piston and biases the piston to the open position. A control chamber is between the piston and an upstream end of the piston housing. A control opening extends through the upstream end of the piston housing and fluidically communicates with the flow duct and the control chamber. A cap extends through the control opening and includes a tubular body extending through the control opening. The cap also includes a closed upstream end and a closed downstream end. A first hole extends radially into the tubular body between the closed upstream end and the piston housing. A second hole extends radially into the tubular body between the piston housing and the closed downstream end. The tubular body fluidically connects the first hole and the second hole.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a self-actuated bleed valve assembly that is disposed in-line with a flow duct for bleeding air from a compressor stage of a gas turbine engine at start-up. A streamlined piston housing is disposed inside the flow duct between an inlet and an outlet of the flow duct, and the piston housing is axially aligned with a center axis of the flow duct. A piston is disposed inside the piston housing and is configured to extend downstream of the piston housing in a closed position. A spring is positioned between the piston housing and the piston to bias the piston to an open position during start-up of the gas turbine engine. As described below with reference to the Figures, the piston housing includes a control opening that allows the fluid in the flow duct to enter the piston housing and exert pressure on the piston. A cap is positioned in the control opening and includes a cap passage configured to turn the fluid entering the cap ninety-degrees twice before the fluid reaches the piston. By turning the fluid ninety-degrees twice, the cap causes the fluid entering the cap to decelerate and drop any particulates or contaminates entrained in the fluid before the fluid reaches the piston inside the piston housing. The cap also decelerates the fluid entering the piston housing sufficiently that the static absolute pressure of the fluid is the only pressure from the fluid acting on the piston. The behavior of the bleed valve assembly is more predictable when the control of the bleed valve assembly is isolated from the dynamic pressure of the fluid.

Figure 1:
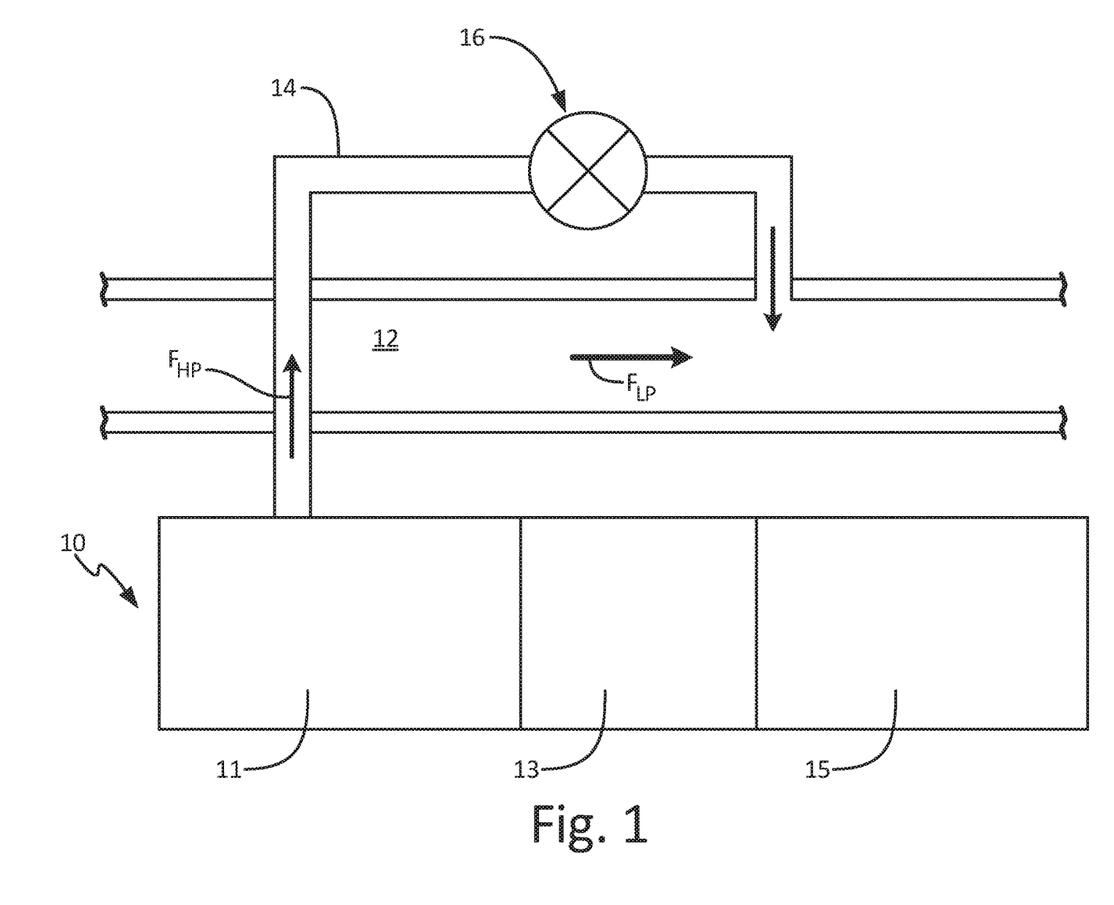
FIG. 1 is a schematic diagram of a gas turbine engine core, a bypass stream, a bleed duct, and bleed valve assembly.

FIG. 1 is a schematic diagram of gas turbine engine core 10, bypass stream 12, bleed duct 14, and bleed valve assembly 16. During operation, high pressure fluid $F_{HP}$ flows through gas turbine engine core 10 and lower pressure fluid $F_{LP}$ travels through bypass stream 12. High pressure fluid $F_{HP}$ and lower pressure fluid $F_{LP}$ can both be air, and high-pressure fluid $F_{HP}$ travels through gas turbine engine core 10 at a higher pressure than the pressure at which lower pressure fluid $F_{LP}$ travels through bypass stream 12. Gas turbine engine core 10 can be a conventional gas turbine engine core with compressor section 11, combustion section 13, and turbine section 15 that drives compressor section 11.

Bypass stream 12 can be a conventional gas turbine engine bypass duct disposed radially outward from gas turbine engine core 10. Alternatively, bypass stream 12 can simply be a vent to atmosphere. Bleed duct 14 fluidically connects compressor section 11 of gas turbine engine core 10 to bypass stream 12. Bleed valve assembly 16 is connected in-line to bleed duct 14 and controls the flow of fluid through bleed duct 14. At start-up, bleed valve assembly 16 is at an open position so that at least a portion of high-pressure fluid $F_{HP}$ in compressor section 11 can bleed away through bleed duct 14 to bypass stream 12. By allowing high-pressure fluid $F_{HP}$ to bleed away from compressor section 11 of gas turbine engine core 10 to bypass stream 12 at start-up, bleed duct 14 and bleed valve assembly 16 reduce the load turbine section 15 experiences from compressor section 11. Once start-up is complete and turbine section 15 is fully powering compressor section 11, bleed valve assembly 16 self-actuates to a closed position to stop the flow of high-pressure fluid $F_{HP}$ through bleed duct 14. When gas turbine engine core 10 is powered-down, bleed valve assembly 16 self-actuates back to the open position to await the next instance of start-up of gas turbine engine core 10. An embodiment of bleed valve assembly 16 is discussed below with reference to FIGS. 2 and 3.

Figure 2:
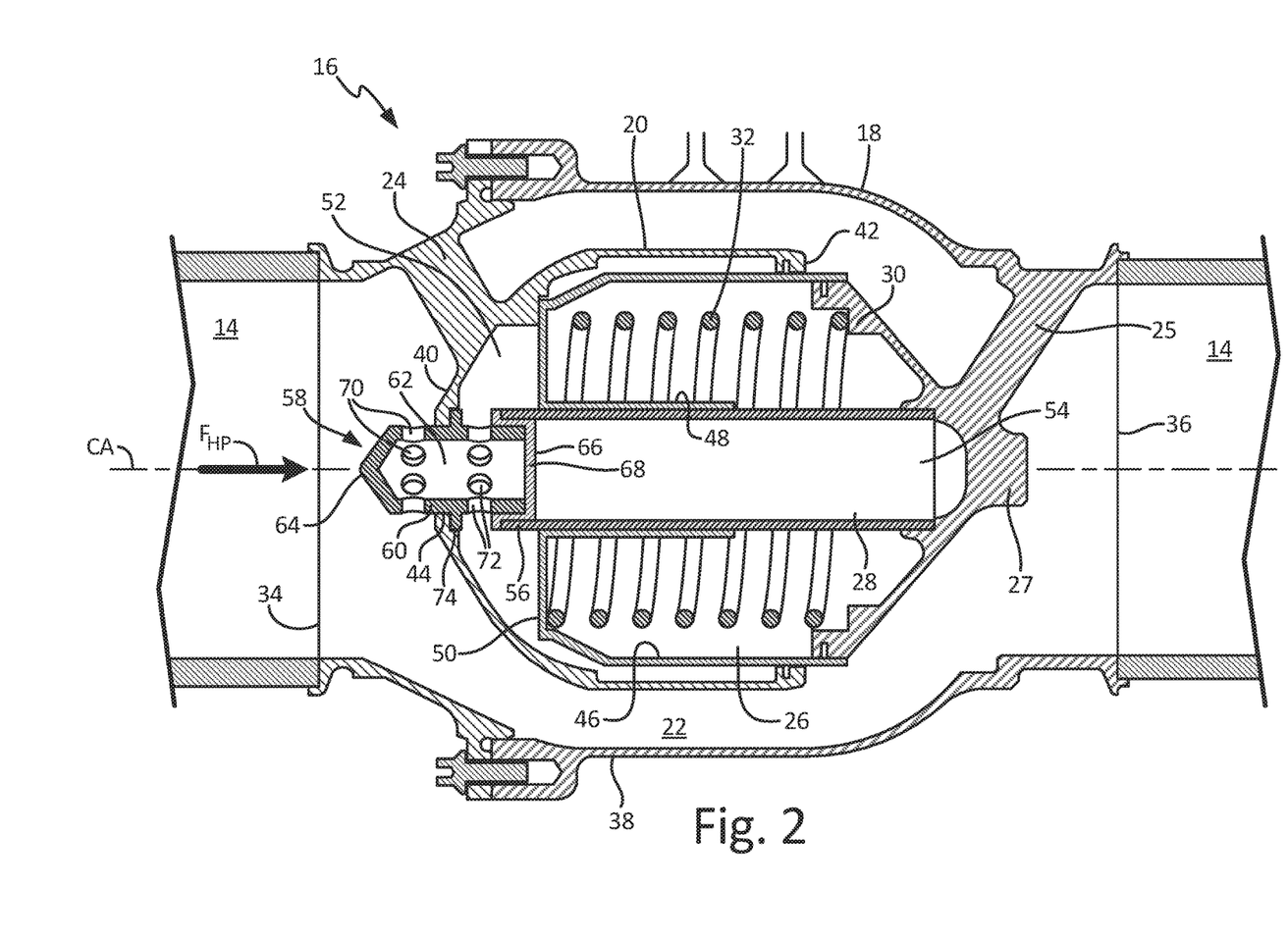
FIG. 2 is a cross-sectional view of a self-actuated inline bleed valve in an open position.
Figure 3:
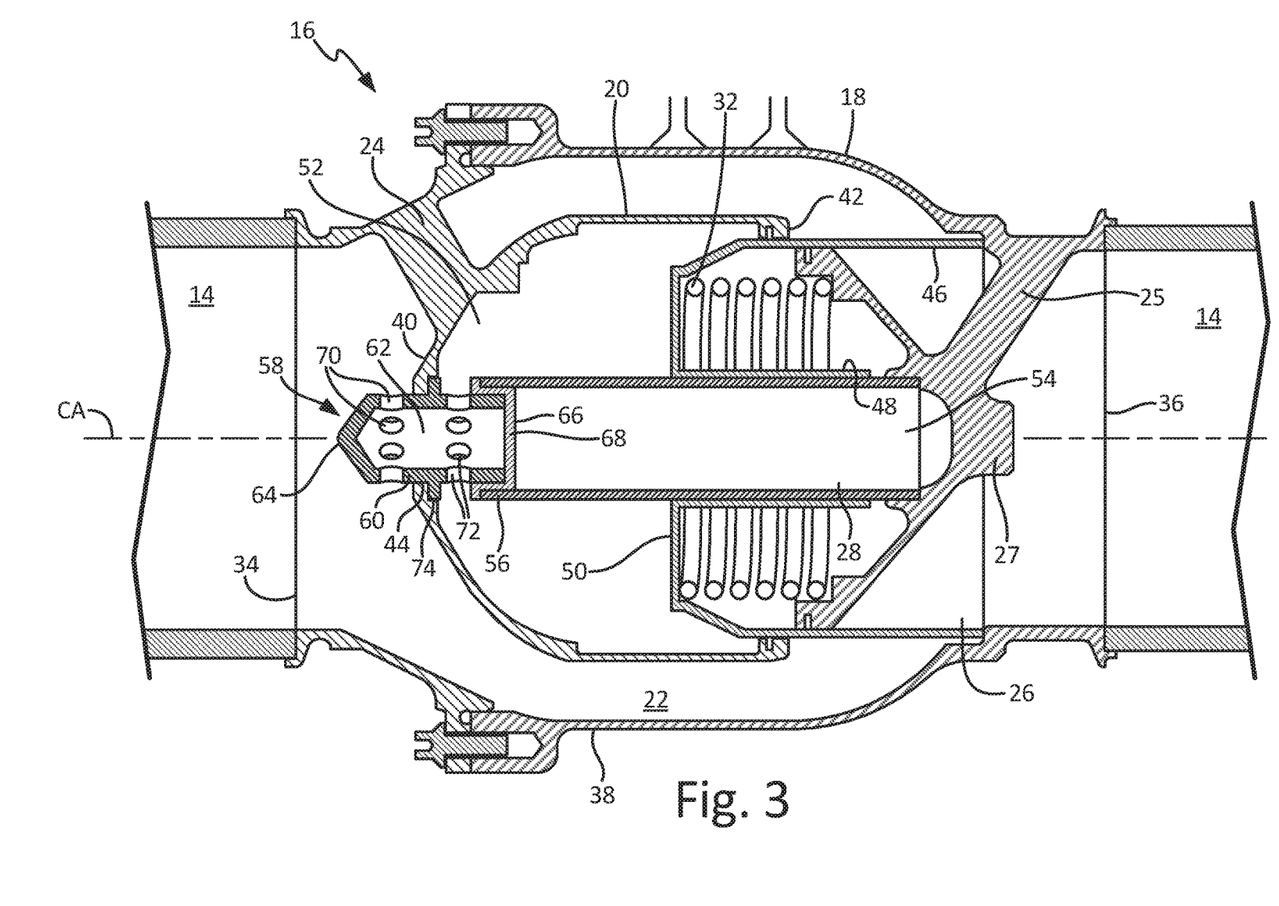
FIG. 3 is a cross-sectional view of the self-actuated inline bleed valve from FIG. 2 in a closed position.

FIGS. 2 and 3 will be discussed concurrently. FIG. 2 is a cross-sectional view of bleed valve assembly 16 in an open position. FIG. 3 is a cross-sectional view of bleed valve assembly 16 in a closed position. As shown in FIGS. 2 and 3, bleed valve assembly 16 includes flow duct 18, piston housing 20, annular flow passage 22, first set of ribs 24, second set of ribs 25, piston 26, downstream hub 27, guide tube 28, spring seat 30, and spring 32. Flow duct 18 forms inlet 34 and outlet 36 of bleed valve assembly 16 and flow duct 18 can include intermediate region 38, and center axis CA. Piston housing 20 includes upstream end 40, downstream end 42, and control opening 44. Piston 26 includes outer wall 46, hub 48, and working surface 50. Bleed valve assembly 16 also includes control chamber 52. Guide tube 28 includes axially spaced downstream end 54 and upstream end 56. Bleed valve assembly 16 also includes cap 58. As shown in FIGS. 2 and 3, cap 58 includes cylindrical body 60, bore 62, closed upstream end 64, closed downstream end 66, plate 68, a first plurality of holes 70, a second plurality of holes 72, and annular flange 74.

As shown in FIG. 2, flow duct 18 of bleed valve assembly 16 is disposed in-line with bleed duct 14 and can form a portion bleed duct 14. Because flow duct 18 of bleed valve assembly 16 is disposed in-line with bleed duct 14, both inlet 34 and outlet 36 of flow duct 18 are aligned along center axis CA of flow duct 18. Outlet 36 is disposed downstream from inlet 34 and intermediate region 38 extends between inlet 34 and outlet 36.

Piston housing 20 is disposed entirely inside flow duct 18 and can also be axially aligned with center axis CA of flow duct 18 such that center axis CA can form the center axis for both flow duct 18 and piston housing 20. Piston housing 20 is positioned within intermediate region 38 of flow duct 18 between inlet 34 and outlet 36. Intermediate region 38 can be larger in cross-sectional area than both outlet 36 and inlet 34 so as to accommodate piston housing 20 without decreasing the cross-sectional flow area inside flow duct 18 between inlet 34 and outlet 36. Intermediate region 38 of flow duct 18 is sufficiently larger in cross-sectional area than piston housing 20 so as to form annular flow passage 22 between flow duct 18 and piston housing 20. Upstream end 40 of piston housing 20 is positioned proximate inlet 34 of flow duct 18. The first set of ribs 24, only one of which is shown in FIG. 2, extend from flow duct 18 to upstream end 40 of piston housing 20 to both connect and space piston housing 20 from flow duct 18. Downstream end 42 of piston housing 20 is spaced axially and disposed downstream from upstream end 40 of piston housing 20 and forms an opening for receiving piston 26. To streamline bleed valve assembly 16 and reduce pressure losses at inlet 34 of bleed valve assembly 16, upstream end 40 of piston housing 20 curves and tapers inward in an upstream direction.

Piston 26 is disposed entirely inside flow duct 18 and at least partially inside piston housing 20 on guide tube 28. Hub 48 of piston 26 is disposed at an axial center of piston 26 and is configured to receive guide tube 28 and slide on guide tube 28. When piston 26 is assembled inside piston housing 20, hub 48 is axially aligned with center axis CA. Outer wall 46 of piston 26 is disposed radially outward from hub 48 and forms an outer diameter of piston 26 relative center axis CA. Outer wall 46 of piston 26 closes annular flow passage 22 proximate outlet 36 when piston 26 is extended downstream of piston housing 20 to a closed position. Working surface 50 extends between hub 48 and outer wall 46 of piston 26 and connects outer wall 46 to hub 48.

Spring seat 30 is connected to downstream hub 27. Downstream hub 27 and spring seat 30 are structurally supported and centered inside flow duct 18 by the second set of ribs 25. The second set of ribs extend radially inward from flow duct 18 to downstream hub 27. Outer wall 46 of piston 26 is larger in diameter than spring seat 30 so that piston 26 can extend past spring seat 30 when in the closed position. Spring seat 30 tapers inward to downstream hub 27 to reduce turbulence and pressure losses proximate outlet 36. Spring 32 is disposed around guide tube 28 and compressed between spring seat 30 and working surface 50 of piston 26. As shown in FIG. 2, spring 32 is a coil spring, but other embodiments can include any other kind of spring suitable for exerting a force opposite working surface 50 of piston 26 and a force against spring seat 30. As shown in FIG. 2, spring 32 biases piston 26 such that piston 26 is at the open position during engine start-up and during engine rest.

Control chamber 52 is formed inside piston housing 20 between piston 26 and upstream end 40 of piston housing 20. Control opening 44 extends through upstream end 40 of piston housing 20 and fluidically communicates with flow duct 18 proximate inlet 34 and control chamber 52. Cap 58 extends through control opening 44. Both control opening 44 and cap 58 are axially aligned with center axis CA of flow duct 18. Guide tube 28 is at least partially disposed inside piston housing 20 and extends between inlet 34 and outlet 36 of flow duct 18 along center axis CA. Upstream end 56 of guide tube 28 is connected to and supported by cap 58. Guide tube 28 extends from cap 58 towards outlet 36 of flow duct 18 along center axis CA. Downstream end 54 of guide tube 28 is connected to downstream hub 27, which is in turn supported and centered inside flow duct 18 by the second set of ribs 25. Guide tube 28 serves as a slide track to guide the movement of piston 26 inside piston housing 20 and flow duct 18.

In the embodiment of FIGS. 2 and 3, cap 58 is formed from cylindrical body 60 and plate 68. Cylindrical body 60 extends through control opening 44. Bore 62 extends into cylindrical body 60 from a downstream end of cylindrical body 60 to form a tubular body. Bore 62 does not fully extend axially through cylindrical body 60 so as to form closed upstream end 64. Plate 68 is connected to the downstream end of cylindrical body 60 over bore 62 to close off bore 62, thereby forming closed downstream end 66 of cap 58. With plate 68 installed on cylindrical body 60, bore 62 extends axially within cylindrical body 60 between closed upstream end 64 and closed downstream end 66 of cap 58. Closed downstream end 66 of cap 58 is disposed inside piston housing 20 and control chamber 52. Closed upstream end 64 of cap 58 is disposed outside of piston housing 20 and upstream of piston housing 20. Closed upstream end 64 of cap 58 is conical and tapers radially inward in the upstream direction. The conical shape of closed upstream end 64 aerodynamically stream-lines cap 58 and reduces pressure loss inside bleed valve assembly 16.

The first plurality of holes 70 extend radially into cylindrical body 60 between closed upstream end 64 and piston housing 20, and intersect with bore 62. The second plurality of holes 72 extend radially into cylindrical body 60 between piston housing 20 and closed downstream end 66, and intersects with bore 62. Annular flange 74 extends radially outward from cylindrical body 60 and is positioned axially between piston housing 20 and the second plurality of holes 70. Annular flange 74 engages piston housing 20 to prevent cap 58 from sliding out of control opening 44. Bore 62 fluidically connects the first plurality of holes 70 and the second plurality of holes 72. The first plurality of holes 70, bore 62, and the second plurality of holes 72 together form a cap passage that extends through cap 58 to fluidically connect inlet 34 of flow duct 18 with control chamber 52 inside piston housing 20. The first plurality of holes 70 function as an inlet to the cap passage, and the second plurality of holes 72 function as the outlet to the cap passage.

For fluid in flow duct 18 to enter and pass through cap 58 the fluid must first turn ninety-degrees from the axial direction to the radial direction to enter the first plurality of holes 70. After passing through the first plurality of holes 70, the fluid must turn ninety-degrees from the radial direction to the axial direction to traverse bore 62. Finally, the fluid inside bore 62 of cap 58 must turn ninety-degrees from the axial direction to the radial direction before the fluid can exit cap 58 through the second plurality of holes 72. After several instances of turning ninety-degrees, the fluid exiting the second plurality of holes 72 has decelerated and lost most of the momentum the fluid had before entering cap 58. Any contaminates or particulates that were entrained in the fluid before the fluid entered cap 58 fall and settle out of the fluid as the fluid turns and decelerates to enter the first plurality of holes 70. If contaminates or particulates manage to pass through the first plurality of holes 72, the further turning and deceleration of the fluid inside cap 58 will cause the remaining contaminates or particulates to fall and settle out of the fluid before the fluid enters control chamber 52. Flow duct 18, piston housing 20, piston 26, guide tube 28, spring seat 30, and cap 58 can all be formed from metal, such as steel, aluminum, titanium, or any other material with the necessary stiffness and durability to withstand the pressures and environment that bleed valve assembly 16 may experience during service.

During engine start-up, piston 26 is at the open position, as shown in FIG. 2, and high-pressure fluid $F_{HP}$ flows from engine core 10 (shown in FIG. 1) through bleed duct 14. High-pressure fluid $F_{HP}$ then enters flow duct 18 of bleed valve assembly 16 by way of inlet 34. As high-pressure fluid $F_{HP}$ flows from inlet 34 into annular flow passage 22, a portion of high-pressure fluid $F_{HP}$ enters cap 58, passes through cap 58 as described above, and enters control chamber 52. The portion of high-pressure fluid $F_{HP}$ that enters into control chamber 52 exerts a static fluid pressure load across working surface 50 of piston 26. The static fluid pressure load acting on working surface 50 of piston 60 is the static absolute pressure of high-pressure fluid $F_{HP}$ entering bleed valve assembly 16 from engine core 10. Because of the tortuous flow passage inside cap 58, the dynamic fluid pressure of high-pressure fluid $F_{HP}$ entering bleed valve assembly 16 does not act on piston 60. During engine start-up, the static fluid pressure load acting on working surface 50 of piston 26 is lower than a preload force exerted by spring 32 to bias piston 26 to the open position.

After high-pressure fluid $F_{HP}$ enters annular flow passage 22, high pressure fluid $F_{Hp}$ flows through annular flow passage 22 and then exits bleed valve assembly 16 through outlet 36 of flow duct 18. Once high-pressure fluid $F_{HP}$ passes through outlet 36, high pressure fluid $F_{Hp}$ enters bypass stream 12 (shown in FIG. 1) where it joins lower-pressure fluid $F_{LP}$ inside bypass stream 12. As discussed above with reference to FIG. 1, bypass stream 12 is generally at a lower pressure than engine core 10.

As engine start-up ends, the static fluid pressure load across working surface 50 of piston 26 increases such that the static fluid pressure load exceeds the preload force of spring 32. As the static fluid pressure load acting on piston 26 exceeds the preload force of spring 32, the static fluid pressure load compresses spring 32 and pushes piston 26 in the downstream direction. As piston 26 moves in the downstream direction, as shown in FIG. 3, outer wall 46 of piston 26 contacts flow duct 18 and closes annular flow passage 22 such that high-pressure fluid $F_{HP}$ can no longer enter bypass stream 12. At the end of the mission or operation cycle of engine core 10, the static fluid pressure of high-pressure fluid $F_{HP}$ inside bleed valve assembly 16 decreases below the preload force of spring 32, and spring 32 moves piston 26 in the upstream direction back to the open position to await the next start-up instance of engine core 10. As briefly noted above and described in greater detail below with reference to FIG. 4

Figure 4:
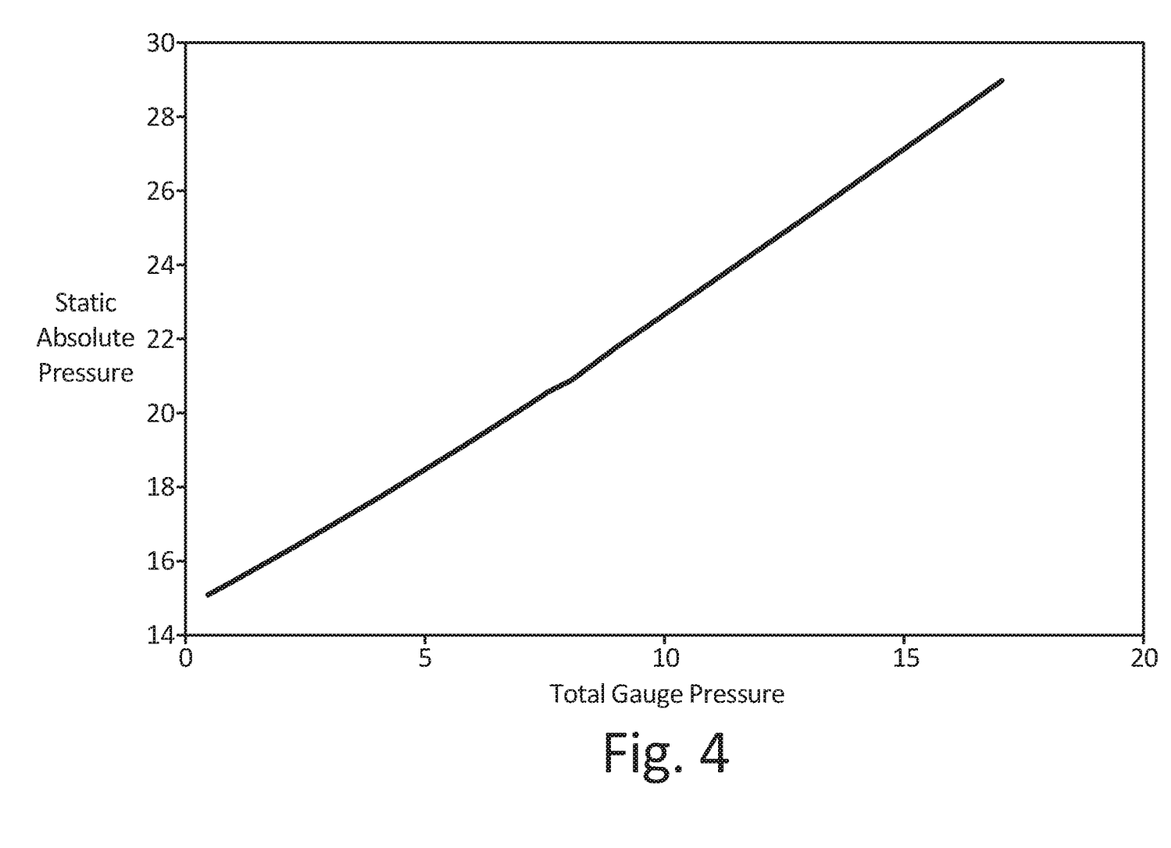
FIG. 4 is a graph of the correlation between a total gage pressure (x-axis) of a fluid entering the self-actuated bleed valve from FIG. 2, and a static absolute pressure (y-axis) inside a cap connected to a control opening of the self-actuated bleed valve.

FIG. 4 is a graph of the correlation between the total gage pressure of high-pressure fluid $F_{HP}$ entering bleed valve assembly 16, and the static absolute pressure of high-pressure fluid $F_{HP}$ inside cap 58 and control chamber 52. The y-axis of the graph in FIG. 4 represents the static absolute pressure of high-pressure fluid $F_{HP}$ entering bleed valve assembly 16. The x-axis of the graph in FIG. 4 represents the total gage pressure of high-pressure fluid $F_{HP}$ entering bleed valve assembly 16. As shown in FIG. 4, the static absolute pressure inside cap 58 and control chamber 52 has a nearly linear correlation with the total gage pressure of high-pressure fluid $F_{HP}$ entering bleed valve assembly 16. Because of the high degree of linear correlation between the total gage pressure of high-pressure fluid $F_{HP}$ and the static absolute pressure inside cap 58 and control chamber 52, the tuning and behavior of bleed valve assembly 16 is more predicable than prior art passive bleed valves whose control was based solely on a total gage pressure of a fluid.

In view of the foregoing description, it will be recognized that the present disclosure provides numerous advantages and benefits. For example, the present disclosure provides bleed valve assembly 16 with cap 58. Cap 58 is positioned in control opening 44 of piston housing 20 and includes a tortuous passage that turns fluid entering piston housing 20 ninety degrees at least twice before entering control chamber 52 inside piston housing 20 By turning the fluid ninety-degrees at least twice, cap 58 causes the fluid entering cap 58 to decelerate and drop any particulates or contaminates entrained in the fluid before the fluid reaches piston 26 inside piston housing 20. Cap 58 also decelerates the fluid entering piston housing 20 sufficiently that the static absolute pressure of the fluid is the only pressure from the fluid acting on piston 26. The behavior of bleed valve assembly 16 is more predictable when the control of bleed valve assembly 16 is based solely on the static absolute pressure of the fluid and isolated from the dynamic pressure of the fluid entering bleed valve assembly 16.

The following are non-exclusive descriptions of possible embodiments of the present invention.

In one embodiment, a valve assembly includes a flow duct with an inlet and an outlet downstream from the inlet. A piston housing is inside the flow duct and is axially aligned with a center axis of the flow duct. A piston is inside the piston housing and is configured to extend downstream of the piston housing in a closed position. A spring is at least partially inside the piston and contacts the piston and biases the piston to an open position. A control chamber is between the piston and an upstream end of the piston housing. A control opening extends through the upstream end of the piston housing and fluidically communicates with the flow duct and the control chamber. A cap extends through the control opening. A cap passage extends through the cap and has an inlet outside of the piston housing and an outlet inside the piston housing, and includes two ninety-degree turns between the inlet and the outlet of the cap passage.

The valve assembly of the preceding paragraph can optionally include, additionally and/or alternatively, any one or more of the following features, configurations and/or additional components:

the cap further comprises: a cylindrical body extending through the control opening; a closed upstream end; and a closed downstream end;

the cap passage further comprises: a bore formed in the cylindrical body and extending between the closed upstream end and the closed downstream end; a first hole extending radially through the cylindrical body between the closed upstream end and the piston housing and forming the inlet of the cap passage; and a second hole extending radially through the cylindrical body between the piston housing and the closed downstream end and forming the outlet of the cap passage;

the bore extends through the cylindrical body of the cap at a downstream end of the cylindrical body, and the cap comprises a plate connected to the downstream end of the cylindrical body over the bore to form the closed downstream end of the cap;

the closed upstream end is conical;

the control opening and the cap are axially aligned with the center axis of the flow duct;

the cap further comprises: a cylindrical body extending through the control opening; an annular flange extending radially outward from the cylindrical body and positioned axially between the piston housing and the outlet of the cap passage;

a guide tube inside the piston housing, wherein the guide tube extends from the cap towards the outlet of the flow duct along a center axis of the piston housing, and wherein the piston is configured to slide on the guide tube; a spring seat connected to a downstream end of the guide tube, wherein the spring seat is smaller in diameter than an outer diameter of the piston, and wherein the spring is disposed between the piston and the spring seat; and/or the valve assembly further comprises: at least one rib extending radially inward from the flow duct to support the spring seat and a downstream end of the guide tube.

In another embodiment, a valve assembly includes a flow duct with an inlet and an outlet downstream from the inlet. A piston housing is inside the flow duct and is axially aligned with a center axis of the flow duct. A piston is inside the piston housing and is configured to extend downstream of the piston housing in a closed position. A spring is at least partially inside the piston and contacts the piston and biases the piston to an open position. A control chamber is between the piston and an upstream end of the piston housing. A control opening extends through the upstream end of the piston housing and fluidically communicates with the flow duct and the control chamber. A cap extends through the control opening and includes a cylindrical body extending through the control opening. The cap also includes a closed upstream end and a closed downstream end. A bore is formed in the cylindrical body and extends between the closed upstream end and the closed downstream end. A first hole extends radially through the cylindrical body between the closed upstream end and the piston housing. A second hole extends radially through the cylindrical body between the piston housing and the closed downstream end.

The valve assembly of the preceding paragraph can optionally include, additionally and/or alternatively, any one or more of the following features, configurations and/or additional components:

the bore extends through the cylindrical body of the cap at a downstream end of the cylindrical body, and the cap comprises a plate connected to the downstream end of the cylindrical body over the bore to form the closed downstream end of the cap;

the control opening and the cap are axially aligned with the center axis of the flow duct;

the closed upstream end is conical;

the cap further comprises: an annular flange extending radially outward from the cylindrical body and positioned axially between the piston housing and the outlet of the cap passage;

a guide tube inside the piston housing, wherein the guide tube extends from the cap towards the outlet of the flow duct along a center axis of the piston housing, and wherein the piston is configured to slide on the guide tube; a spring seat connected to a downstream end of the guide tube, wherein the spring seat is smaller in diameter than an outer diameter of the piston, and wherein the spring is disposed between the piston and the spring seat; and/or the valve assembly further comprises: at least one rib extending radially inward from the flow duct to support the spring seat and a downstream end of the guide tube.

In another embodiment, a valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A piston is inside the piston housing and is configured to extend downstream of the piston housing in a closed position. A spring is at least partially inside the piston and contacts the piston and biases the piston to the open position. A control chamber is between the piston and an upstream end of the piston housing. A control opening extends through the upstream end of the piston housing and fluidically communicates with the flow duct and the control chamber. A cap extends through the control opening and includes a tubular body extending through the control opening. The cap also includes a closed upstream end and a closed downstream end. A first hole extends radially into the tubular body between the closed upstream end and the piston housing. A second hole extends radially into the tubular body between the piston housing and the closed downstream end. The tubular body fluidically connects the first hole and the second hole.

The valve assembly of the preceding paragraph can optionally include, additionally and/or alternatively, any one or more of the following features, configurations and/or additional components:

the control opening and the cap are axially aligned with the center axis of the flow duct;

the closed upstream end is conical; and/or a guide tube is inside the piston housing, wherein an upstream end of the guide tube is supported by the cap, and the guide tube extends from the cap towards the outlet of the flow duct along a center axis of the piston housing, and wherein the piston is configured to slide on the guide tube.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 2 and 3 show cap 58 with a conical closed upstream end 64, closed upstream end 64 can include a geometry that is not conical (such as a round or curved geometry). In addition, many modifications may be made to adapt a particular situation or material to the teachings of the invention without departing from the essential scope thereof. For example, while bleed valve assembly 16 has been described with reference to gas turbine engines, bleed valve assembly 16 can be used in any application where a self-actuated, in-line bleed valve is needed. Therefore, it is intended that the invention not be limited to the particular embodiment(s) disclosed, but that the invention will include all embodiments falling within the scope of the appended claims.

The invention claimed is:

1. A valve assembly comprising:
   a flow duct with an inlet and an outlet downstream from the inlet;
   a piston housing inside the flow duct, wherein the piston housing is axially aligned with a center axis of the flow duct;
   a piston inside the piston housing and configured to extend downstream of the piston housing in a closed position;
   a spring at least partially inside the piston, wherein the spring contacts the piston and biases the piston to the open position;
   a control chamber between the piston and an upstream end of the piston housing;
   a control opening extending through the upstream end of the piston housing, wherein the control opening fluidically communicates with the flow duct and the control chamber; and
   a cap extending through the control opening, wherein the cap comprises:
      a cap passage extending through the cap, wherein the cap passage comprises an inlet outside of the piston housing and an outlet inside the piston housing, and wherein the cap passage has two ninety-degree turns between the inlet and the outlet of the cap passage.

2. The valve assembly of claim 1, wherein the cap further comprises:
   a cylindrical body extending through the control opening;
   a closed upstream end; and
   a closed downstream end.

3. The valve assembly of claim 2, wherein the cap passage further comprises:
   a bore formed in the cylindrical body and extending between the closed upstream end and the closed downstream end;
   a first hole extending radially through the cylindrical body between the closed upstream end and the piston housing and forming the inlet of the cap passage; and a second hole extending radially through the cylindrical body between the piston housing and the closed downstream end and forming the outlet of the cap passage.

4. The valve assembly of claim 3, wherein the bore extends through the cylindrical body of the cap at a downstream end of the cylindrical body, and the cap comprises a plate connected to the downstream end of the cylindrical body over the bore to form the closed downstream end of the cap.

5. The valve assembly of claim 3, wherein the closed upstream end is conical.

6. The valve assembly of claim 1, wherein the control opening and the cap are axially aligned with the center axis of the flow duct.

7. The valve assembly of claim 6, wherein the cap further comprises:
   a cylindrical body extending through the control opening; and
   an annular flange extending radially outward from the cylindrical body and positioned axially between the piston housing and the outlet of the cap passage.

8. The valve assembly of claim 7, further comprising:
   a guide tube inside the piston housing, wherein the guide tube extends from the cap towards the outlet of the flow duct along a center axis of the piston housing, and wherein the piston is configured to slide on the guide tube;
   a spring seat connected to a downstream end of the guide tube, wherein the spring seat is smaller in diameter than an outer diameter of the piston, and
   wherein the spring is disposed between the piston and the spring seat.

9. The valve assembly of claim 8, wherein the valve assembly further comprises:
   at least one rib extending radially inward from the flow duct to support the spring seat and a downstream end of the guide tube.

10. A valve assembly comprising:
    a flow duct with an inlet and an outlet downstream from the inlet;
    a piston housing inside the flow duct, wherein the piston housing is axially aligned with a center axis of the flow duct;
    a piston inside the piston housing and configured to extend downstream of the piston housing in a closed position;
    a spring at least partially inside the piston, wherein the spring contacts the piston and biases the piston to the open position;
    a control chamber between the piston and an upstream end of the piston housing;
    a control opening extending through the upstream end of the piston housing, wherein the control opening fluidically communicates with the flow duct and the control chamber; and
    a cap extending through the control opening, wherein the cap comprises:
       a cylindrical body extending through the control opening;
       a closed upstream end;
       a closed downstream end;
       a bore formed in the cylindrical body and extending between the closed upstream end and the closed downstream end;
       a first hole extending radially through the cylindrical body between the closed upstream end and the piston housing; and
       a second hole extending radially through the cylindrical body between the piston housing and the closed downstream end.

11. The valve assembly of claim 10, wherein the bore extends through the cylindrical body of the cap at a downstream end of the cylindrical body, and the cap comprises a plate connected to the downstream end of the cylindrical body over the bore to form the closed downstream end of the cap.

12. The valve assembly of claim 11, wherein the control opening and the cap are axially aligned with the center axis of the flow duct.

13. The valve assembly of claim 12, wherein the closed upstream end is conical.

14. The valve assembly of claim 13, wherein the cap further comprises:
    an annular flange extending radially outward from the cylindrical body and positioned axially between the piston housing and the outlet of the cap passage.

15. The valve assembly of claim 14, further comprising:
    a guide tube inside the piston housing, wherein the guide tube extends from the cap towards the outlet of the flow duct along a center axis of the piston housing, and wherein the piston is configured to slide on the guide tube;
    a spring seat connected to a downstream end of the guide tube, wherein the spring seat is smaller in diameter than an outer diameter of the piston, and
    wherein the spring is disposed between the piston and the spring seat.

16. The valve assembly of claim 15, wherein the valve assembly further comprises:
    at least one rib extending radially inward from the flow duct to support the spring seat and a downstream end of the guide tube.

17. A valve assembly comprising:
    a flow duct comprising:
       an inlet; and
       an outlet downstream from the inlet;
    a piston housing inside the flow duct between the inlet and the outlet so as to form an annular flow passage between the flow duct and the piston housing, wherein the piston housing is axially aligned with a center axis of the flow duct;
    a piston inside the piston housing and configured to extend downstream of the piston housing in a closed position;
    a spring at least partially inside the piston, wherein the spring contacts the piston and biases the piston to the open position;
    a control chamber between the piston and an upstream end of the piston housing;
    a control opening extending through the upstream end of the piston housing, wherein the control opening fluidically communicates with the flow duct and the control chamber; and
    a cap extending through the control opening, wherein the cap comprises:
       a tubular body extending through the control opening;
       a closed upstream end;
       a closed downstream end;
       a first hole extending radially into the tubular body between the closed upstream end and the piston housing; and
       a second hole extending radially into the tubular body between the piston housing and the closed downstream end, wherein the tubular body fluidically connects the first hole and the second hole.

18. The valve assembly of claim 17, wherein the control opening and the cap are axially aligned with the center axis of the flow duct.

19. The valve assembly of claim 18, wherein the closed upstream end is conical.

20. The valve assembly of claim 19, further comprising:
a guide tube inside the piston housing, wherein an upstream end of the guide tube is supported by the cap, and the guide tube extends from the cap towards the outlet of the flow duct along a center axis of the piston housing, and wherein the piston is configured to slide on the guide tube.

* * * * *